United States Patent
Yang et al.

(10) Patent No.: US 12,413,457 B1
(45) Date of Patent: Sep. 9, 2025

(54) BURST ERROR DETECTION AND CORRECTION

(71) Applicant: Alphawave IP Inc., Toronto (CA)

(72) Inventors: Ming Yang, Toronto (CA); James Raymond Bailey, Toronto (CA); Shayan Shahramian, Richmond Hill (CA)

(73) Assignee: Alphawave IP Inc., Toronto (CA)

( * ) Notice: Subject to any disclaimer, the term of this patent is extended or adjusted under 35 U.S.C. 154(b) by 57 days.

(21) Appl. No.: 18/480,030

(22) Filed: Oct. 3, 2023

Related U.S. Application Data

(60) Provisional application No. 63/500,258, filed on May 4, 2023, provisional application No. 63/379,440, filed on Oct. 13, 2022.

(51) Int. Cl.
*H04L 25/03* (2006.01)

(52) U.S. Cl.
CPC .. *H04L 25/03267* (2013.01); *H04L 25/03057* (2013.01); *H04L 2025/0349* (2013.01)

(58) Field of Classification Search
CPC ......... H04L 25/03267; H04L 25/03057; H04L 2025/0349
See application file for complete search history.

(56) References Cited

U.S. PATENT DOCUMENTS

| | | | |
|---|---|---|---|
| 2020/0295871 A1* | 9/2020 | Lu | H04L 1/0061 |
| 2021/0306009 A1 | 9/2021 | Riani et al. | |
| 2023/0136077 A1* | 5/2023 | Lu | H04L 1/1887 |
| | | | 370/328 |
| 2025/0023763 A1* | 1/2025 | Lu | H04L 25/03267 |

OTHER PUBLICATIONS

Boesch, Ryan, Signal preconditioning using feedforward equalizers in ADC-based data links, Dissertation, Stanford University, May 2016, 158 pages.
Dey et al., Low-Latency Burst Error Detection and Correction in Decision-Feedback Equalization, IEEE Open Journal of Circuits and Systems, vol. 2, 2021, pp. 91-100.
Agilent Technologies, Advanced Design System 2011, Numeric Components, FFE, Description: feed-forward equalizer, Library: Numeric, Communications, Class: SDFFFE, Sep. 2011, pp. 124-128.

(Continued)

*Primary Examiner* — Janice N Tieu
(74) *Attorney, Agent, or Firm* — Almanac IP Advisors LLP

(57) ABSTRACT

A receiver for providing a corrected output symbol sequence is disclosed. A decision feedback equalizer (DFE) generates an output sequence of DFE decision symbols; a second feed forward equalizer (FFE) generates a second equalized output symbol sequence; and correction logic, responsive to determination of an end of burst error position of a burst error sequence in the DFE output sequence, determines a candidate earliest start of burst position, and determines the corrected output symbol sequence by comparing the second equalized output symbol sequence with candidate symbol sequences that correspond to corrections of DFE decision output symbols in the burst error sequence.

26 Claims, 12 Drawing Sheets

(56) References Cited

OTHER PUBLICATIONS

Huawei et al., Elimination of DFE Error Propagation and Post-FEC Error Floor (Precoding 2.0), IEEE 802.3 100 GB/s, 200 GB/s, and 400 GB/s Electrical Interfaces Task Force, Mar. 7, 2019, 15 pages.
Meybodi et al., Design and Implementation of an On-Demand Maximum-Likelihood Sequence Estimation (MLSE), IEEE Open Journal of Circuits and Systems, vol. 3, 2022, pp. 97-108.
Palermo, Sam, ECEN689: Special Topics in High-Speed Links Circuits and Systems Spring 2010, Lecture 19: RX DFE Equalization, 2010, 19 pages.
Partial response signalling, 4 pages.
Prof. David Johns, Partial Response and Viterbi Detection, University of Toronto, D.A. Johns, 1997, 30 pages.
Siemens, Overview of Channel Equalization Techniques for Serial Interfaces, Siemens Digital Industries Software, 2021, 46 pages.
Yang, Ming, Global Optimization of Wireline Transceivers for Minimum Post FEC vs. Pre FEC BER, DesignCon 2021, Aug. 2021, 40 pages.
Bergmans, Jan W.M., Digital Baseband Transmission and Recording, Springer Science & Business Media, Section 6.2 Partial-Response Equalization, and Section 6.3 Decision-Feedback Equalization, 1996, pp. 266-283.

* cited by examiner

4-PAM symbol set:{0,1,2,3}, α=0.6, no 1/(1+D) precoding
EoBD = +1 when DFE input > 3+ε; EoBD = -1 DFE input < 0-ε
In this example ε = 0.5

Transmitter

| TX Pattern | 1 | 3 | 2 | 3 | 1 | 2 | 2 | 2 | 0 | 3 | 1 | 2 |
|---|---|---|---|---|---|---|---|---|---|---|---|---|
| 1+D TX |   | 3 | 4 | 5 | 5 | 4 | 3 | 4 | 2 | 3 | 4 | 3 |

Receiver
PATH 1

| 1+0D FFE (with noise) 102 | 1.1 | 3.2 | 2.4 | 2.8 | 1.1 | 2.0 | 2.2 | 0.2 | 2.8 | 1.1 | 2.1 |
|---|---|---|---|---|---|---|---|---|---|---|---|
| 1+D FFE (with noise) 104 | 1.1 | 4.3 | 5.6 | 5.2 | 3.9 | 3.1 | 4.2 | 2.4 | 3.0 | 3.9 | 3.2 |
| DFE Quantizer Input 208 | 1.1 | 3.3 | 2.6 | 2.2 | 1.9 | 1.1 | 3.2 | -0.6 | 3.0 | 0.9 | 2.2 |
| DFE Output 131 | 1 | 3 | 3 | 2 | 2 | 1 | 3 | 0 | 3 | 1 | 2 |
| DFE Error 103 | 0 | 0 | +1 | -1 | -1 | 0 | +1 | 0 | 0 | 0 | 0 |
| EoBD 132 | 0 | 0 | 0 | 0 | 0 | 0 | 0 | -1 | 0 | 0 | 0 |

PATH 2

| 1+0.6D FFE (with noise) 133 | 1.10 | 3.86 | 4.32 | 4.24 | 2.78 | 2.66 | 3.40 | 1.52 | 2.92 | 2.78 | 2.76 |
|---|---|---|---|---|---|---|---|---|---|---|---|

Inside Correction Logic

| Zigzag DFE Correction 135 | 1 | 4(3) | 2 | 3 | 1 | 2 | 2 | 0 | 3 | 1 | 2 |
|---|---|---|---|---|---|---|---|---|---|---|---|
| Corrected DFE out of range (Point A-1) | 0 | 1 | 0 | 0 | 0 | 0 | 0 | 0 | 0 | 0 | 0 |
| k | 1 | 2 | 3 | 4 | 5 | 6 | 7 | 8 | 9 | 10 | 11 |

Fig. 2A

|  | $e_{s,1}$ | $e_{c,2}$ | $e_{c,3}$ | $e_{c,4}$ | $e_{c,5}$ | $e_{c,6}$ | SUM |
|---|---|---|---|---|---|---|---|
| Correction Case 1 | 0.52 | 0.04 | 0.02 | 0.06 | 0.20 | 0.32 | 1.16 |
| Correction Case 2 | 0.48 | 0.56 | 0.02 | 0.06 | 0.20 | 0.32 | 1.64 |
| Correction Case 3 | 0.48 | 0.44 | 0.58 | 0.06 | 0.20 | 0.32 | 2.08 |
| Correction Case 4 | 0.48 | 0.44 | 0.42 | 0.54 | 0.20 | 0.32 | 2.40 |
|  | $e_{I,1}$ | $e_{I,2}$ | $e_{I,3}$ | $e_{I,4}$ | $e_{s,5}$ | $e_{c,6}$ |  |
| Correction Case 5 | 0.48 | 0.44 | 0.42 | 0.46 | 0.80 | 0.32 | 2.92 |
|  | $e_{I,1}$ | $e_{I,2}$ | $e_{I,3}$ | $e_{I,4}$ | $e_{I,5}$ | $e_{I,6}$ |  |
| No Correction | 0.48 | 0.44 | 0.42 | 0.46 | 0.20 | 0.28 | 2.18 |
| k | 3 | 4 | 5 | 6 | 7 | 8 |  |
| j | 1 | 2 | 3 | 4 | 5 | 6 |  |

In this example L=5

Fig. 2B

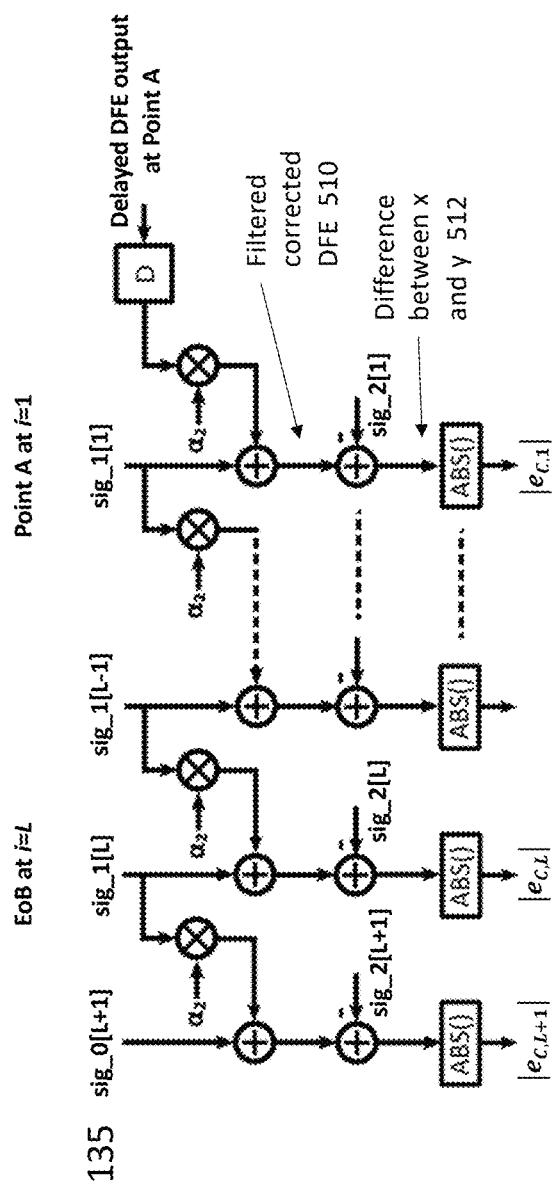
An example assuming $N=1$ and $M=0$.
Index i assumes Point A is at $i=1$.
Fig. 5A calculates the corrected signal error $e_{C,i}$ using the filtered corrected DFE output sequence and the FFE 120 equalized sequence
Fig. 5B calculates distance of the candidate sequence correcting only the last symbol at EoB New EoBD Method: Path 3 for Overflow/Underflow

BURST ERROR DETECTION AND CORRECTION

CROSS-REFERENCE TO RELATED APPLICATIONS

This application claims the benefit of priority to U.S. Provisional Application No. 63/379,440, filed 13 Oct. 2022, and U.S. Provisional Application No. 63/500,258, filed 4 May 2023, all of which are incorporated in their entirety herein.

FIELD

The disclosure relates generally to data communications and, in particular, to error detection and correction.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Frequency-dependent channel loss has been a major challenge to achieve a higher data rate. Therefore, equalization has become a critical component of high speed interconnects such as SerDes. Equalization approaches include linear equalization such as feedforward equalization (FFE), and non-linear equalization such as decision feedback equalization (DFE), which are known to be adaptive approaches. The linear equalizer is often preferred because of its simplicity but its performance is often limited due to cross talk and noise amplification while compensating for high-frequency losses.

In contrast, DFE corrects intersymbol interference (ISI) without amplifying noise and therefore, is more effective for long-reach channels with higher loss. However, DFE can correct only post-cursor ISIs. The link needs to equalize pre-cursor ISI through transmitter side or receiver side FFE.

FFE equalization, however, comes at the cost of SNR. Moreover, in DFE, because decisions are fed back to compute the next decision, an incorrect decision can lead to error propagation. DFE can lead to a burst error, a sequence of closely-spaced (usually consecutive) symbol errors. Others have addressed this issue, including M. Meybodi, H. Gomez, Y.-C. Lu, H. Shakiba and A. Sheikholeslami, "Design and Implementation of an On-Demand Maximum-Likelihood Sequence Estimation (MLSE)," *IEEE Open Journal of Circuits and Systems*, vol. 3, pp. 97-108, 2022, doi: 10.1109/OJCAS.2022.3173686.

It is desired to develop improved approaches to address DFE error propagation.

SUMMARY OF THE DISCLOSURE

Embodiments of the disclosure provide a receiver and a method of operating a receiver for providing a corrected output symbol sequence. According to embodiments of the disclosure, the receiver includes:

- a decision feedback equalizer (DFE) for generating an output sequence of DFE decision symbols based at least in part upon an input symbol sequence;
- a second feed forward equalizer (FFE) for generating a second equalized output symbol sequence (also referred to herein as a "second FFE output symbol sequence," and referred to in related Application No. 63/379,440 as a "second equalized input symbol sequence");
- correction logic, responsive to determination of an end of burst error (EoB) position of a burst error sequence in the DFE output sequence, that is operable to:
- determine a candidate earliest start of burst (SoB) position; and
- determine the corrected output symbol sequence based at least in part upon a sequence comparison of the second equalized output symbol sequence with candidate symbol sequences that correspond to corrections of DFE decision output symbols in the burst error sequence,
- wherein the sequence comparison includes a comparison of symbols residing between the candidate earliest SoB position and one position after the EoB position (inclusive).

According to embodiments of the disclosure, the receiver further comprises a first FFE that is operable to generate a first equalized output symbol sequence, coupled to an input of the DFE, based at least in part upon the input symbol sequence, wherein the first equalized output symbol sequence is different from the second equalized output symbol sequence.

According to embodiments of the disclosure, each symbol of the second equalized output symbol sequence includes intersymbol interference (ISI) from at least one postcursor or at least one precursor.

According to embodiments of the disclosure, the comparison is performed on candidate symbols residing between M symbol positions before the candidate earliest SoB position and N positions after the EoB position (inclusive), wherein each symbol of the second equalized output symbol sequence includes ISI from M precursors and N postcursors.

According to embodiments of the disclosure, the comparison is not performed on candidate symbols more than M symbol positions before the candidate earliest SoB position or more than N positions after the EoB position, wherein the second equalized output symbol sequence includes M precursors and N postcursors.

According to embodiments of the disclosure, the correction logic is operable to determine the corrected output symbol sequence based upon determination of an actual SoB position.

According to embodiments of the disclosure, the receiver further comprises EoB detection logic, wherein the DFE includes a quantizer, and the EoB detection logic is operable to determine the EoB position based upon determining a symbol position that is one position before a symbol position in which a quantizer input symbol is out of range of a range of values of the quantizer.

According to embodiments of the disclosure, the receiver further comprises: EOB detection logic; a third FFE for providing a plurality of third equalized output symbols based at least in part upon the input symbol sequence; and an FIR filter for providing a plurality of filtered DFE output symbols comprising weighted delayed versions of the DFE decision output symbols, wherein the DFE includes a quantizer, and the EOB detection logic is operable to determine the EoB position based upon determining a symbol position that is one position before a symbol position in which a difference between a third FFE output symbol, of the plurality of third equalized output symbols, and a filtered DFE output symbol, of the plurality of filtered DFE output symbols, is out of range of a range of values of the quantizer, wherein a weighting $\alpha 3$ of the filtered DFE output symbols is different from a first weighting $\alpha 1$ of the DFE output symbols in a feedback loop within the DFE. According to embodiments of the disclosure, the weighting ($\alpha 3$) of the filtered DFE output symbols equals 1. According to embodiments of the disclosure, the receiver further comprises: a fourth FFE for providing a plurality of fourth equalized output symbols based at least in part upon the input symbol sequence; and a second DFE for providing a plurality of second DFE output symbols based at least in part upon the plurality of fourth equalized output symbols, and having a feedback loop including a second weighting ($\alpha 4$ assumed=1 in examples; not shown in FIG. 8) different from the first weighting $\alpha 1$, wherein the EOB detection logic is operable to determine the EoB position based upon determining a symbol position that is one position (k−1) before: a symbol position k at which there is a first, non-zero difference at time k between an output symbol, of the plurality of output symbols, of the DFE and a second DFE output symbol, of the plurality of second DFE output symbols, of the second DFE, or if there is no such first difference, a symbol position k at which a difference 1109 at time k between the third FFE output symbol and the filtered DFE output symbol is out of range of a range of values of the quantizer. According to embodiments of the disclosure, the first weighting $\alpha 1$ is less than or equal to the second weighting $\alpha 4$, which is less than or equal to 1.

According to embodiments of the disclosure, the receiver, further comprises: EOB detection logic; a third FFE for providing a plurality of third equalized output symbols based at least in part upon the input symbol sequence; and an FIR filter for providing a plurality of filtered DFE output symbols comprising weighted ($\alpha 3$) delayed versions of the DFE decision output symbols, a quantizer for providing a plurality of quantizer output symbols based at least in part upon the plurality of third FFE output symbols and the plurality of filtered DFE output symbols, wherein the EOB detection logic is operable to determine the EoB position based upon determining a symbol position that is one position (k−1) before: a symbol position k at which there is a first, non-zero difference at time k between an output symbol, of the plurality of output symbols, of the DFE and a quantizer output symbol, of the plurality of quantizer output symbols, or, if there is no such first difference, a symbol position k at which a difference at time k between the third FFE output symbol and the filtered DFE output symbol is out of range of a range of values of the quantizer. According to embodiments of the disclosure, a first weighting $\alpha 1$ of the DFE is less than or equal to a second weighting $\alpha 3$ of the FIR filter, which may be less than or equal to 1.

According to embodiments of the disclosure, the correction logic is operable to determine the candidate earliest SoB position based upon determining a symbol position that is one position after a symbol position in which a corrected DFE output symbol would be out of range for the modulation scheme of the symbols.

According to embodiments of the disclosure, a first of the candidate symbol sequences corresponds to a corrective application to the DFE output symbol sequence of a first candidate error sequence having error values occupying all positions between the candidate earliest SoB position and the EoB position (inclusive), and subsequent candidate symbol sequences each correspond to a corrective application to the DFE output symbol sequence of a candidate error sequence having error values occupying all positions starting with a successively incremented position after the candidate earliest SoB position and ending with the EoB position. According to embodiments of the disclosure, the candidate symbol sequences include the DFE output symbol sequence without corrective application of any error values. According to embodiments of the disclosure, the candidate error sequences comprise error values having sequentially alternating signs. According to embodiments of the disclosure, the candidate error sequences comprise alternating error values.

According to embodiments of the disclosure, the sequence comparison comprises computing distances between the second equalized output symbol sequence and the candidate symbol sequences. The corrected output symbol sequence may correspond to a candidate symbol sequence corresponding to a minimum of the distances.

According to embodiments of the disclosure, the receiver further comprises a shared FFE that is operable to perform preliminary equalization on a preliminary input symbol sequence to produce the input symbol sequence, wherein: the first FFE is operable to perform first partial response equalization of the input symbol sequence to generate the first equalized output sequence that is input to the DFE; and the second FFE is operable to perform second partial response equalization of the input symbol sequence to generate the second equalized output symbol sequence. According to embodiments of the disclosure, the first partial response equalization comprises $1+\alpha 1 D$ feed forward equalization, and the second partial response equalization comprises feed forward equalization having one or more weighted delays. According to embodiments of the disclosure, $\alpha 1=1$, and at least one of the weighted delays is not equal to 1.

According to embodiments of the disclosure, the candidate symbol sequences correspond to FIR-filtered corrections of DFE decision output symbols in the burst error sequence.

BRIEF DESCRIPTION OF THE DRAWINGS

FIGS. 2A-2B illustrate an example of error detection and correction, according to embodiments of the disclosure.

FIGS. 4-5B depict logic circuitry for computing the distance between candidate corrected symbol sequences and a second equalized output symbol sequence according to embodiments of the disclosure.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Embodiments of the disclosure provide an error detection and correction system and methods that may be used for high speed interconnections, e.g., for connecting functional blocks within chips as well as connections between chips and between sub-systems.

Figure 1A:
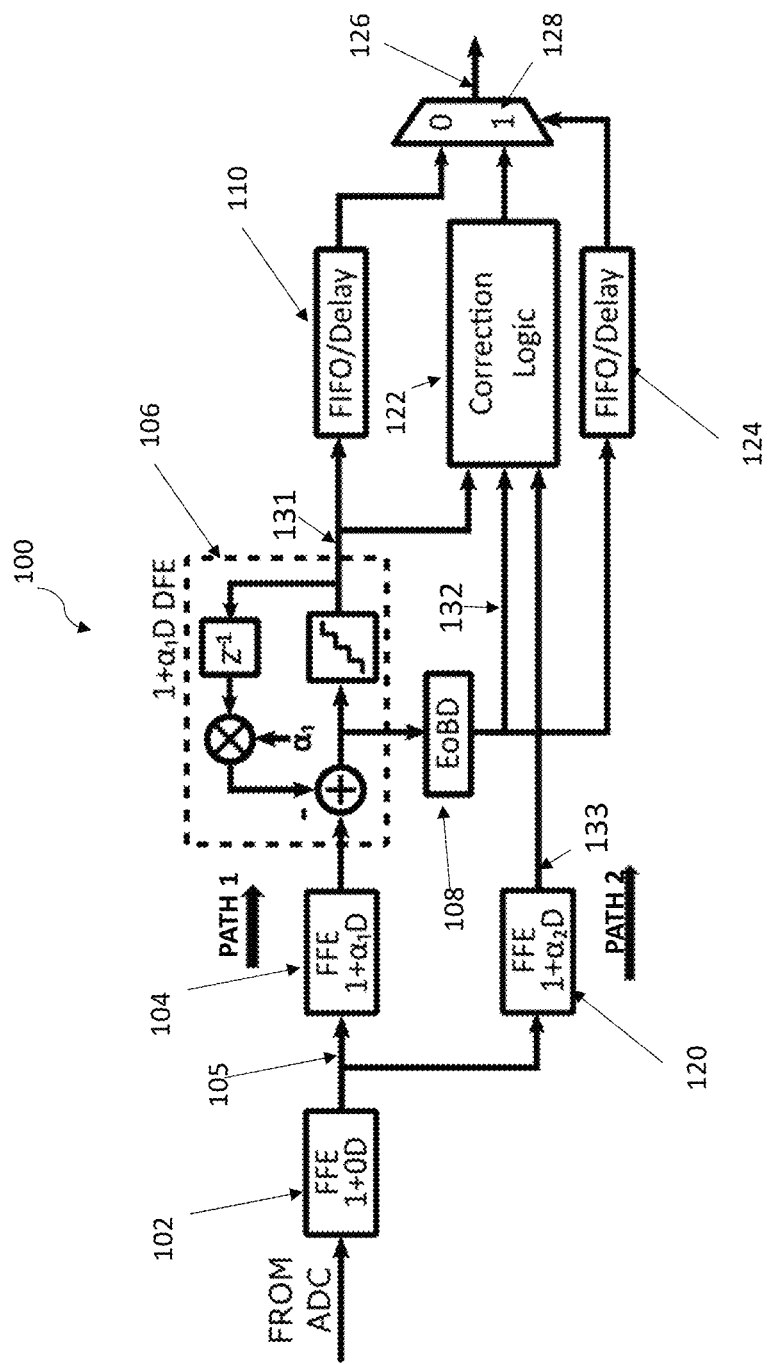
FIG. 1A depicts an error detection and correction system, according to embodiments of the disclosure.

FIG. 1A depicts an error detection and correction system 100 according to embodiments of the disclosure. A received analog input signal, such as a multi-level 4-PAM signal, is digitized by an analog to digital converter to produce a preliminary input symbol sequence, which is equalized by 1+0D feedforward equalizer (FFE) 102 to generate an input sequence 105 of digital symbols.

In the notation herein, a person of ordinary skill in the art would understand that 1+0D FFE represents the result of the FFE filter, i.e., it creates a response in which it attempts to remove all pre- and post-cursor ISI and preserves only the main cursor (indicated by "1" in "1+0D"). The "D" in this FFE notation does not represent just a single delay in the FFE FIR filter. In fact, the FFE 102 likely employs many taps in the attempt to achieve elimination of all ISI. More generally, a person of ordinary skill would recognize that "1+αD" in the term "1+αD FFE" refers to an FFE with tap weights (of any number) targeting a partial response of 1+αD. In the special case of a 1+αD FFE with α=0, that FFE is an FFE with tap weights (of any number) targeting an overall response having no ISI.

This is to be contrasted with the 1+αD DFE notation, which a person of ordinary skill understands to represent the application of a weight a to a single delay in the DFE feedback loop around the quantizer, and does not represent the output of the DFE filter. According to embodiments of the disclosure, a first path, Path 1, includes at least shared 1+0D feedforward equalizer (FFE) 102, 1+α$_1$D FFE 104, and 1+α$_1$D decision feedback equalizer (DFE) 106 (where α$_1$=1 in this example). A second path, Path 2, includes at least shared 1+0D FFE 102, 1+α$_2$D FFE 120 and correction logic 122. An α$_2$ value of approximately 0.6-0.7 provides optimum noise performance for many long-reach serializer-deserializer (SerDes) applications. (The term "logic" herein refers to logic circuitry, firmware or hardware to implement the associated functionality described herein.)

According to embodiments of the disclosure, shared FFE 102 attempts to remove all ISI (data-dependent noise), at the cost of amplifying data-independent noise. Along the first path, in this example, 1+α$_1$D FFE 104 reintroduces a first postcursor, and provides the resulting sequence to the DFE 106. Like FFE 104, FFE 120 also reintroduces a first postcursor. Because shared FFE 102 has already attempted to remove all ISI, the subsequent FFEs 104 and 120 require relatively few taps to reintroduce the controlled ISI required for their (1+α$_1$D) and (1+α$_2$D) partial response targets, respectively.

In general, the number of delays in the feedback path of the DFE 106 will equal the number of delays of the FFE 104 to cancel the postcursor ISI introduced by FFE 104.

Figure 1B:
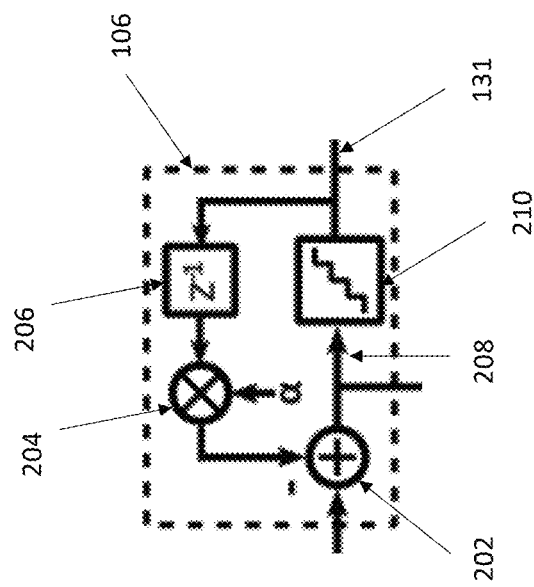
FIG. 1B depicts the DFE of FIG. 1A, according to embodiments of the disclosure.

According to embodiments of the disclosure with reference to FIG. 1B, the DFE 106 includes a summer 202, a multiplier 204, a delay 206, and a quantizer 210. The quantizer may also be referred to as a "slicer," which may, for example, make decisions based on thresholds. DFE 106 removes the postcursor residual ISI. The Path 2 signal processing results in less FFE noise amplification than processing of the received signal in Path 1.

According to embodiments of the disclosure, the DFE 106 provides its output to a FIFO/Delay 110, which feeds one input of a multiplexer (mux) 128, and to correction logic 122, which feeds another input of the mux 128. If an end of burst (EoB) detector 108 detects an end of burst by observing the input 208 to the DFE quantizer 210, it outputs a control signal to cause mux 128 to select the output of the correction logic 122 as input for output at 126. The control signal also triggers operation of the correction logic 122.

FIGS. 2A-2B illustrate an example of error detection and correction, according to embodiments of the disclosure. The example assumes 4-PAM modulation with a symbol set of {0, 1, 2, 3}, α=0.6, and no 1/(1+D) precoding. (Precoding can mitigate burst error events, but comes with drawbacks.) The value α is assumed to be positive. The example also assumes end of burst detection (EoBD)=+1 when DFE quantizer input 208>3+ε; EoBD=−1 when DFE quantizer input 208<0−ε. In this example ε=0.5.

FIG. 2A shows, on the transmitter side, an example transmitted symbol sequence ("TX Pattern"). In this example, the window of interest is arbitrarily chosen to be 11 symbols, to illustrate a burst of five consecutive errors with a few symbols on either side. The figure goes on to show, on the receiver side, the symbols at various points along signal processing paths Path 1 and Path 2, including an error-corrected sequence inside the correction logic 122 in Path 2.

Determine End of Burst (EoB)

According to embodiments of the disclosure, the EoBD logic 108 detects an end of burst (EoB) position based upon the DFE 106 quantizer input 208. (All logic in this disclosure may be implemented in hardware, software, firmware, or a combination thereof.) The quantizer input may be represented as:

$$Qin_k = FFE\_104_k - \alpha_1 \cdot DFE\_output_{k-1}$$

where $Qin_k$ is the quantizer input at time k,
$FFE\_104_k$ is the output of FFE 104 at time k, and
$DFE\_output_k$ is the DFE 106 output 131 at time k.

Thus, for example, assuming $\alpha_1=1$, at time k=1, $Qin_1 = FFE\_104_1 - DFE\_output_0 = 1.1 - 0 = 1.1$; at time k=2, $Qin_2 = FFE\_104_2 - DFE\_output_1 = 4.3 - 1 = 3.3$, and so on.

Due to feedback of an erroneous decision (the delayed version of the DFE quantizer output 131), a DFE can propagate errors, leading to an alternating or "zigzag" error burst pattern as shown by DFE Error polarity sequence 103 in the figure.

It is known in the art that the DFE error burst will eventually settle on a correct symbol decision, usually because the feedback error has a cumulative effect on the symbol decision output. When the quantizer input 208 exceeds the quantizer input range (either below the minimum or above the maximum value (e.g., in the 4-PAM symbol set {0, 1, 2, 3}) by a tolerance value, ε), the EoBD logic 108 will decide the DFE Output symbol is one of the extrema, which will be the correct decision. Thereafter, the DFE output 131 will remain correct, at least until the next error burst starts.

Thus, when the quantizer input 208 exceeds its input range by the tolerance value, the symbol decision at that time will be correct, and the previous symbol decision will represent the end of burst (EoB).

In this example, at time k=8, at the DFE quantizer input 208, $Qin_8$=FFE_$104_8$–DFE_$output_7$=2.4–3=–0.6, which is out of range of the symbol set {0, 1, 2, 3} by an amount exceeding the tolerance value, ε, i.e., –0.6 is less than 0–ε=0–0.5=–0.5. (References to in or out of "range" in the claims should be interpreted to account for the tolerance value, unless otherwise indicated.) The EoBD (EoB detection) sequence 132 that is output by the EoBD detector 108 shows the out of range event at time k=8. The EoBD 132 out of range error (but not the EoB position itself) is indicated by (–1), because it is less than the minimum value member of the symbol set by an amount exceeding the tolerance value. Thus, the EoB occurs at time k=7, and its sign is the opposite, i.e., the last DFE error is +1 because the error is known to alternate. Conversely, if the out of range error were +1, the EoB error would be –1.

Based on the determination of the sign of the last error in the error burst pattern, the correction logic 122 may determine the rest of the error burst as an alternating pattern going backward (decrementing k) from the EoB. However, the start of the burst (SoB) is not yet known, and must be determined in order to determine at which position error correction should commence.

Determine Earliest Potential Start of Burst (SoB) ("Point A")

If the EoBD logic 108 detects an EoB, it triggers the correction logic 122 and selects the other input ("1" in this example) of the mux 128. The correction logic 122 then uses the detected EoB position based on EoBD logic output 132, the alternating error pattern derived from the EoB position, and the DFE 106 output 131 to determine the earliest potential start of burst ("Point A") and correct the burst error. These operations involve values from Path 1.

The correction logic 122 applies the alternating DFE error pattern 103 (which ends at EoB position k=7 in this example) to the DFE Output 131 to generate candidate corrected sequences. According to embodiments of the disclosure, the correction logic 122 determines the starting point of the error pattern to be applied. According to embodiments of the disclosure, to do so, the correction logic 122 first determines the earliest potential start of burst ("Point A"). According to embodiments of the disclosure, the correction logic 122 determines at which position the candidate correction would result in a corrected DFE output symbol that would be outside the valid symbol set {0, 1, 2, 3}, and thus could not be correct.

In this example, the correction logic 122 works backward from the EoB position, subtracting the DFE error from the DFE output to obtain a potential corrected output sequence (Zigzag DFE Correction (sig_1) 135 in the figure). At position k=2, application of the error (–1) to the symbol (3) results in (3–(–1))=4, which is out of range of the 4-PAM symbol set {0, 1, 2, 3}. Thus, at k=2, the potential correction is incorrect, and k=3 (one symbol after the invalid correction) is the earliest potential start of error burst (SoB) (Point A). (Note that the figure does not show a (–1) error at position k=2 in the DFE Error 103 because –1 is a candidate, and not an actual, error.)

Figure 3:
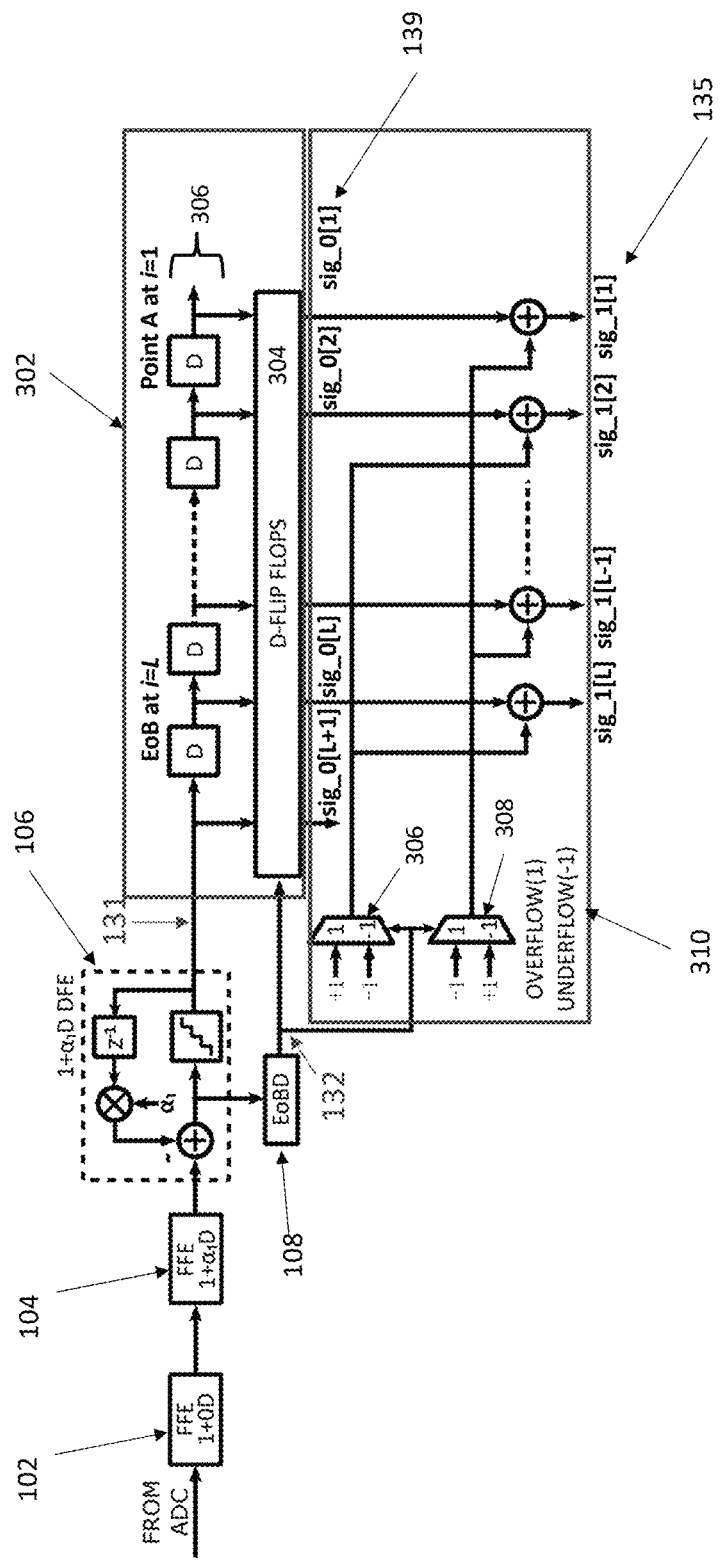
FIG. 3 depicts logic circuitry for finding the earliest possible SoB position, according to embodiments of the disclosure.

FIG. 3 depicts logic circuitry 302 and 310 for finding the earliest possible SoB position, according to embodiments of the disclosure. The logic generates the full candidate error pattern (from the two muxes) and applies correction to a latched version 139 (sig_0[1] . . . sig_0[L]) of the DFE output sequence 131, generating the corrected DFE sequence 135 (sig_1[1] . . . sig_1[L]).

A delay line 306 receives the DFE output sequence 131. Flip flops 304 latch the DFE output sequence 131 from the delay line 306. Upon triggering by the output signal 132 of the EoBD 108, the flip flops 304 output the stored sequence as (sig_0[1] . . . sig_0[L+1]) 139, where L is the position of the EoB.

Based on whether the EoBD 108 indicates an underflow (–1) or an overflow (1), muxes 306, 308 apply an alternating potential correction sequence of (–1, 1, –1 . . . ) or (1, –1, 1, . . . ) to the stored DFE output sequence 139 from the flip flops 304, to obtain the potential corrected output sequence 135, (sig_1[1], sig_1[k] . . . sig_1[L]).

The selection signal for muxes 306 and 308 uses the sign of the EoBD out of range error. The output of mux 306 is responsible for correcting the DFE output at EoB (k=7) and other odd numbered errors at k=5, k=3 . . . etc. If the out of range signal is –1, the error at EoB is +1, and thus mux 306 outputs –1 for correction. To correct the next DFE output at k=6 (and other even numbered k), mux 308 is used. If EoB were at an even numbered position, operation of the muxes with respect to even and odd numbered errors would be reversed.

At a position k, working backward from L, where sig_1[k] is the first out of range value of the symbol set, that position k is one position before the earliest potential start of error burst (SoB) (Point A). (After Point A is identified using time index k, Point A is designated with time index i=1.) The phrase "working backward from L" refers to k=7 and i=L in this example. Also note that in FIG. 3, the out of range value would appear at sig_1[0], which is not shown in the figure.

Determine Actual Start of Burst (SoB)

At this stage, the correction logic 122 knows the earliest potential start of burst (SoB) (Point A) and the EoB position. The correction logic 122 next determines the actual SoB. According to embodiments of the disclosure, the correction logic 122 employs a maximum likelihood sequence detection (MLSD)-type approach. The correction logic 122 attempts to correct the DFE output with all possible candidate error patterns ending at the EoB position and beginning with all possible SoB positions (thereby generating candidate corrected DFE output sequences, labeled Ci below). Note that the candidate error patterns include a candidate "error" pattern with no errors to preserve the original DFE output sequence.

For each candidate error pattern, the correction logic 122 determines the likelihood that each candidate error pattern (starting at a successively different candidate SoB position) applied as an attempt to correct the DFE output would result in an error-free DFE output. According to embodiments of the disclosure, the correction logic 122 does so by determining the distance (e.g., Euclidean, sum of absolute values) between each candidate filtered corrected DFE output sequence and the Path 2 front-end, FFE equalized symbol sequence (the 1+$α_2$D FFE 120 output 133, in this example).

For a like-to-like comparison with the 1+$α_2$D FFE 120 output, the correction logic 122 applies 1+$α_2$D filtering to the candidate corrected DFE output sig_1 135, resulting in the filtered corrected DFE output 510. In the absence of noise, the output of FFE 120 would be the TX Pattern passed through a 1+$α_2$D filter. The properly corrected DFE output sequence, filtered by 1+$α_2$D, should closely resemble the output of FFE 120.

Each distance may, for example, be found using the sum of the squares of, or the absolute value of, the differences between the candidate filtered corrected DFE output symbols and the equalized output symbols output by FFE 120. The correction logic 122 designates the candidate (unfiltered) corrected DFE output sequence associated with the minimum distance as the corrected receiver output sequence.

By including in the candidate error patterns a candidate error pattern without any corrections applied, i.e., an uncorrected pattern resulting in the uncorrected DFE output sequence, the correction logic 122 accounts for potential false positives (e.g., errors detected where there are no errors).

By using DFE error detection in Path 1 in combination with a front-end, FFE equalized symbol sequence in Path 2 to determine the corrected sequence, the receiver 100 uses a reliable approach for determining an EoB error (in Path 1) and a very good approach for correcting the errors using Path 2 with high SNR and low BER. Different a values are used in path 1 and path 2: $\alpha_1=1$ in path 1 is good for reliably detecting EoB, and $\alpha_2<1$ typically results in better SNR and lower BER through path 2. More generally, the responses of FFE 104 and FFE 120 can be optimized separately to allow for accurate EoB detection and low BER respectively.

Embodiments of the disclosure also minimize the hardware overhead incurred by relatively complex distance computations by performing them on a very limited subset of symbols for which a potential burst error is detected.

Figure 4:
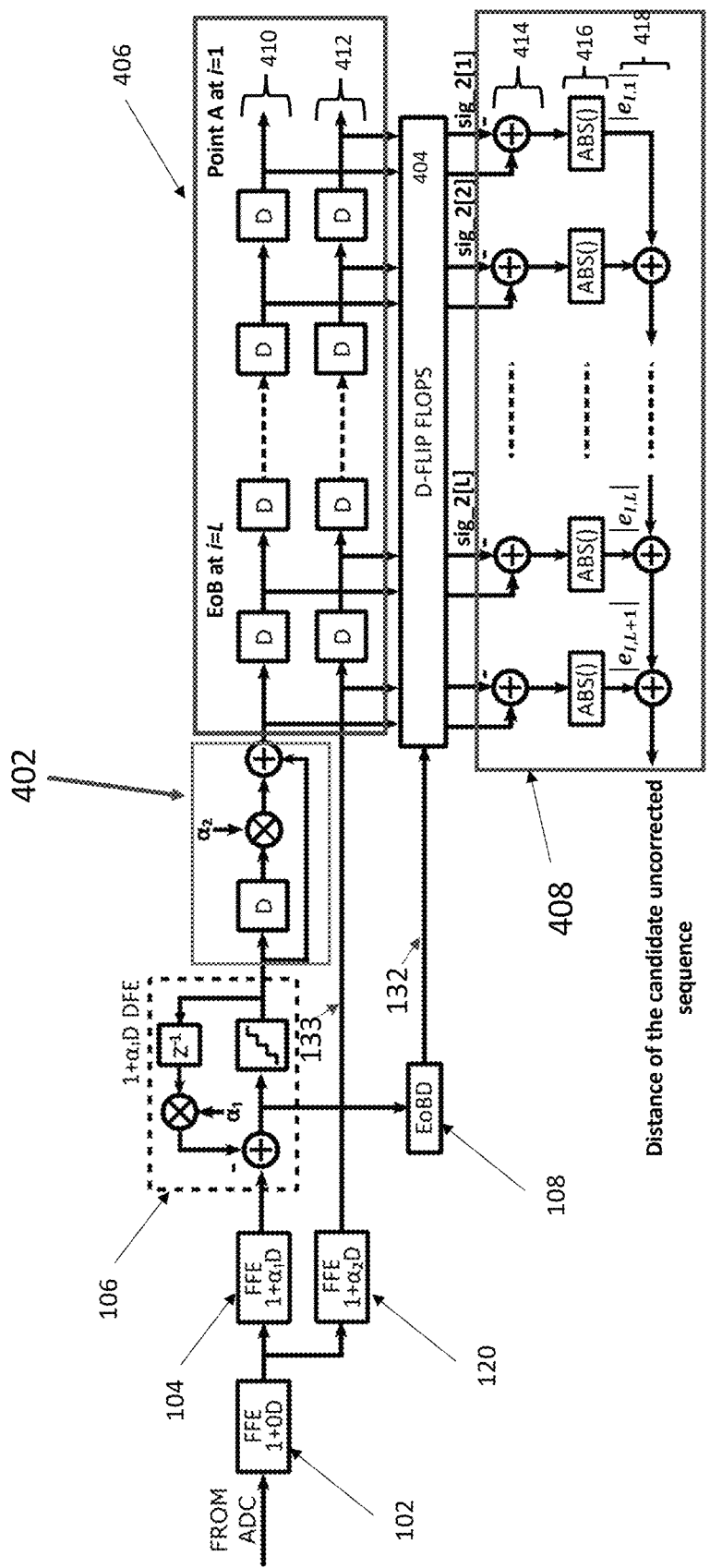

FIGS. 4-5 depict logic circuitry in the correction logic 122 for computing the distance between filtered candidate corrected symbol sequences and a second equalized output symbol sequence 133 output by FFE 120, according to embodiments of the disclosure. In this example, FIR filter 402 filters the output of DFE 106.

Delay lines 410, 412 receive the filtered DFE 106 output sequence and the FFE 120 output sequence 133, respectively. Flip flops 404 store the sequences from the delay lines 410, 412. Upon triggering by the output signal 132 of the EoBD 108, the flip flops 404 output the filtered DFE 106 output sequence and the FFE 120 output sequence 133 to summers 414 in distance computing logic 408 for subtraction. Absolute value logic 416 takes the absolute values of those differences. Summers 418 add those absolute values to compute the distance.

Logic 408 computes the distance of the candidate uncorrected sequence as the sum of all $|e_{I,i}|$, the initial signal errors (distances) between the (delayed) symbols of the FFE 120 equalized sequence (sig_2[1] ... sig_2[L+1]) and the filtered uncorrected DFE output sequence.

FIG. 5A illustrates the case in which each symbol in corrected DFE sequence 135 (sig_1[1] ... sig_1[L]) is subjected to $1+\alpha_2 D$ filtering to generate the filtered corrected DFE sequence 510. That is, this is the case ("C1") in which the error sequence is applied to all the symbols in the DFE output sequence between Point A and EoB, and then filtered, to generate the corresponding candidate filtered corrected sequence. The cases for C2-C6 are not shown in FIG. 5A, but the skilled artisan would understand how the logic would be modified for those cases.

The FFE 120 output sequence (sig_2[1] ... sig_2[L+1]) is subtracted from the filtered corrected DFE sequence 510, and the absolute values of the differences 512 are taken and summed to obtain the distance of the first candidate sequence (Correction Case 1) in which all DFE output symbols between Point A and EoB were corrected.

Figure 5B:
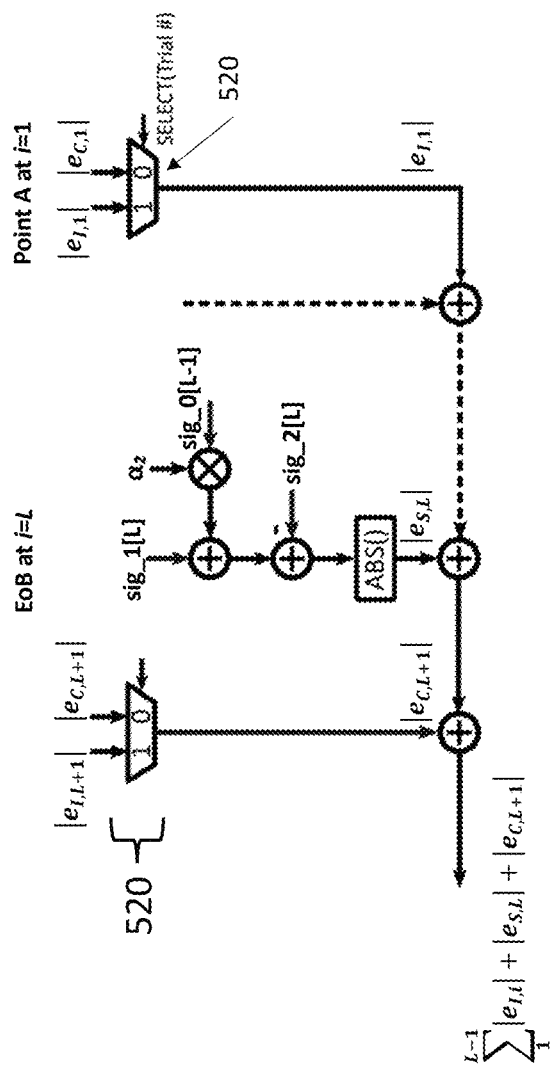

FIG. 5B depicts logic for computing the distance between the filtered corrected DFE output sequence symbols and the equalized symbols at the FFE 120 output. Specifically, the example calculates the distance of the candidate sequence correcting only the last symbol at EoB. In this example, for all symbol distances between SoB and EoB-1 (inclusive), the DFE output is uncorrected, thus enabling reuse of the intermediate error terms $|e_{I,i}|$ in FIG. 4. Each mux 520 before EoB selects $|e_{I,i}|$ as the output. At EoB (i=L), the $1+\alpha_2 D$ filter corrected DFE output 510 is the summation of the corrected DFE output 135 sig_1[L] at EoB and the uncorrected DFE output 139 sig_0[L-1] scaled by $\alpha_2$ at EoB-1. Then, the distance at EoB $|e_{S,L}|$ is the absolute difference between the filter corrected DFE output 510 and the FFE 120 output sig_2[L]. Last, the appropriate mux 520 at EoB+1 selects $|e_{C,L+1}|$. The summation of all error terms is the distance of the candidate sequence correcting only the last symbol at EoB in this example.

To calculate the distance between the FFE 120 second equalized sequence and other filtered corrected DFE output sequences, the correction logic executes the same algorithm as above, but each time including one more $|e_{C,i}|$ term and one fewer $|e_{I,i}|$ term in the calculation.

Mathematical Generalization

In more mathematical terms, when an end-of-burst is detected at time index i=L, the correction logic 122 corrects error bursts of up to length L errors starting at an unknown time (the SoB). Note that i=1 is Point A, and i=L is the EoB position. Assuming FFE 120 has N post-cursor taps and M=0 pre-cursor taps, the correction logic 122 computes:

Initial signal error, $e_{I,i}$ (per-symbol distance at time index i without any DFE correction)

Corrected signal error, $e_{C,i}$ (per-symbol distance at time index i by applying the full candidate error pattern to the DFE output)

Start-of-burst signal error, $e_{S,i}$ (per-symbol distance at time index i by applying the $i^{th}$ candidate error pattern (with correcting pattern staring at index i to the DFE output)

For example, the sum of all $|e_{I,i}|$ is the distance between the filtered uncorrected candidate sequence and the sequence 133 at the FFE 120 output. The correction logic 122 computes the sum of absolute error values for all possible start of burst positions for $1 \leq j \leq L$, as shown below. The time index corresponds to the minimum distance is selected as the SoB.

$$SoB = \underset{j}{\mathrm{argmin}}\left[\sum_{1-M}^{j-1}|e_{I,i}| + |e_{S,j}| + \sum_{j+1}^{L+N}|e_{C,i}|\right]$$

Note that, for the general case of the output 133 of FFE 120 including M precursors and N postcursors, the distance is computed between candidate symbols residing between M symbol positions before the candidate earliest SoB position (Point A) and N positions after the EoB position (inclusive).

Going back to the example, the correction logic 122 has determined Point A (k=3) and the EoB (k=7). Using this information, in embodiments of the disclosure the correction logic 122 determines the SoB and corrects the burst error.

The correction logic 122 attempts to correct the DFE output with all possible candidate error patterns (including a candidate error pattern with no attempted error correction) ending at the EoB position (k=7) and beginning with all possible SoB positions starting at Point A (k=3), thereby generating candidate corrected DFE output sequences.

The correction logic 122 considers the following candidate error patterns for the "DFE Error" row in FIG. 2A:

0 0 +1 −1 +1 −1 +1 0 0 0 0
0 0 0 −1 +1 −1 +1 0 0 0 0
0 0 0 0 +1 −1 +1 0 0 0 0
0 0 0 0 0 −1 +1 0 0 0 0
0 0 0 0 0 0 +1 0 0 0 0
0 0 0 0 0 0 0 0 0 0 0←no-error sequence Subtracting each candidate error pattern from the DFE output results in the candidate corrected error sequences C1-C6, each starting at a different candidate SoB position, including no SoB and EoB for the last sequence.

In general, the impact of the last DFE correction (at EoB) on the filtered corrected DFE output not only affects the filtered corrected DFE output value at EoB (k=7 in this example), but also affects up to EoB+N (in this example, N=1), where N is the number of postcursors in the output of FFE 120 (based on the number of post cursor delay taps). Here, because of the one time unit delay of FFE 120, applying correction to the burst error could affect the filtered corrected DFE output from k=3 to k=8.

For convenience, the sequences below show the candidate corrected sequences only between those time indexes (inclusive). "Ci" labels each candidate corrected sequence, except the last sequence, which is uncorrected. The vertical pipe symbol "I" indicates the boundary between successively corrected and uncorrected symbols at candidate SoB positions between k=3 and k=7 (inclusive).

For example, starting with k=3, $$C1 = DFE\_output - DFE\ error$$
$$= (3\ 2\ 2\ 1\ 3\ 0) - (+1\ -1\ +1\ -1\ +1\ 0)$$
$$= 2\ 3\ 1\ 2\ 2\ 0$$

The full set of candidate corrected sequences is:
C1 2 3 1 2 2 0
C2 3|3 1 2 2 0
C3 3 2|1 2 2 0
C4 3 2 2|2 2 0
C5 3 2 2 1|2 0
C6 3 2 2 1 3 0←no correction: same as DFE Output The ideal is for the correction logic 122 to determine a filtered corrected DFE output sequence that is closest to the received sequence optimized for the highest possible SNR, which, in this case would be the output of the 1+α$_2$D FFE 120, where α$_2$=0.6. Referring to FIG. 5A, as mentioned above, for a like-to-like comparison, the correction logic 122 also applies 1+α$_2$ D filtering to the candidate corrected DFE outputs. This results in the candidate filtered corrected sequences (e.g., sequence 510 for the case of applying candidate corrected sequence C1 to the DFE output) below (starting at k=3).

| Zigzag DFE Correction | 1 | 4(3) | 2 | 3 | 1 | 2 | 2 | 0 | 3 | 1 | 2 |
|---|---|---|---|---|---|---|---|---|---|---|---|
| Invalid Correction | 0 | 1 | 0 | 0 | 0 | 0 | 0 | 0 | 0 | 0 | 0 |
| 1 + 0.6 D After Correction Case 1 | | | 3.8 | 4.2 | 2.8 | 2.6 | 3.2 | 1.2 | | | |
| 1 + 0.6 D After Correction Case 2 | | | 4.8 | 4.8 | 2.8 | 2.6 | 3.2 | 1.2 | | | |
| 1 + 0.6 D After Correction Case 3 | | | 4.8 | 3.8 | 2.2 | 2.6 | 3.2 | 1.2 | | | |
| 1 + 0.6 D After Correction Case 4 | | | 4.8 | 3.8 | 3.2 | 3.2 | 3.2 | 1.2 | | | |
| 1 + 0.6 D After Correction Case 5 | | | 4.8 | 3.8 | 3.2 | 2.2 | 2.6 | 1.2 | | | |
| 1 + 0.6 D No Correction Case 6 | | | 4.8 | 3.8 | 3.2 | 2.2 | 3.6 | 1.8 | | | |

According to embodiments of the disclosure, the correction logic 122 in FIGS. 3-5 determines the distance (here the sum of the absolute values of each difference between each candidate filtered corrected DFE output sequence and the Path 2 front-end, FFE equalized symbol sequence (the 1+α$_2$D FFE 120 output 133 in this example)). The resulting distances are shown in FIG. 2B.

Because the distance for Case 1 is the smallest, the candidate corrected DFE output sequence of Case 1, i.e., (2 3 1 2 2), starting at the candidate SoB position k=3 and ending at EoB position k=7, is the corrected output sequence to be output by the correction logic 122 via the mux 128 in this example.

EoB Detection: Other Embodiments

Figure 7:
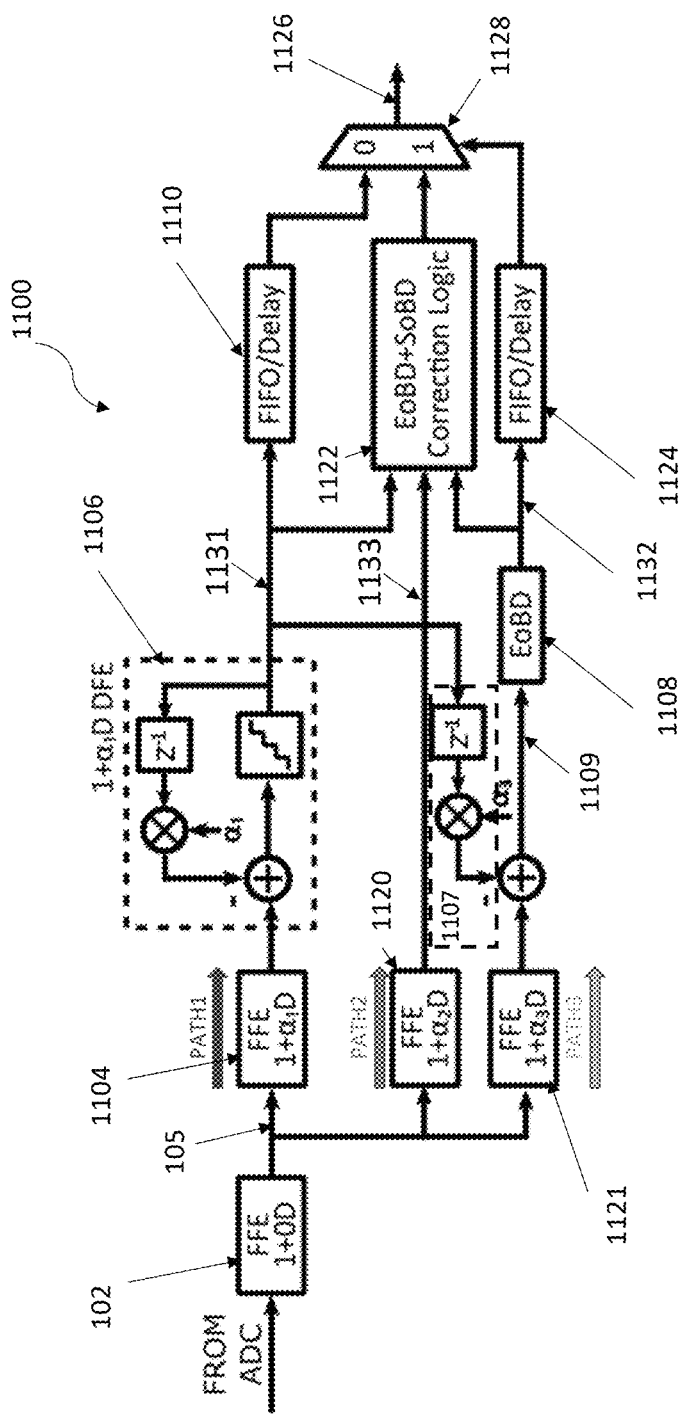
FIG. 7 depicts another error detection and correction system, according to embodiments of the disclosure.

FIG. 7 depicts another error detection and correction system 1100 according to embodiments of the disclosure. A received analog input signal, such as a multi-level 4-PAM signal, is digitized by an analog to digital converter and equalized by 1+0D feedforward equalizer (FFE) 1102 to generate an input sequence 105 of digital symbols.

According to embodiments of the disclosure, a first path, Path 1, includes at least a shared 1+0D feedforward equalizer (FFE) 102, 1+α$_1$D FFE 1104, and 1+α$_1$D decision feedback equalizer (DFE) 1106 (where α$_1$<1 in this example). A second path, Path 2, includes at least shared 1+0D FFE 1102, 1+α$_2$D FFE 1120 and correction logic 1122.

According to embodiments of the disclosure, the DFE 106 provides its output to a FIFO/Delay 1110, which feeds one input of a multiplexer (mux) 1128, and to correction logic 1122, which feeds another input of the mux 1128. If an end of burst (EoB) detector 1108 detects an end of burst, it outputs a control signal to cause mux 1128 to select the output of the correction logic 1122 as input for output at 1126. The control signal also triggers operation of the correction logic 1122.

According to embodiments of the disclosure, a third FFE 1121 provides a plurality of third FFE output symbols based at least in part upon the input symbol sequence 105. Logic 1107 provides a plurality of filtered DFE output symbols comprising delayed versions of the DFE decision output symbols 1131 weighted by α$_3$.

The EOB detection logic 1108 determines the EoB position based upon determining a symbol position that is one position before a symbol position in which a difference 1109 between a third FFE output symbol of FFE 1121, of the plurality of third FFE output symbols, and a filtered DFE output symbol, of the plurality of filtered DFE output symbols, is out of range of the range of values of the quantizer of the DFE 1106.

Alternatively, the EOB detection logic 1108, or the EoB detection logic in the other embodiments herein, determines the EoB position based upon comparison (e.g., with a comparator inside the EOB detection logic) of difference 1109 or a similar difference with values representing the quantizer range.

According to embodiments of the disclosure, a weighting of the filtered DFE output symbols is different from a first weighting of the DFE output symbols in a feedback loop within the DFE 1106, relating to a difference between the weightings, $\alpha_1$ and $\alpha_3$, of FFE 1 1104 and FFE 3 1121, respectively.

Note that if $\alpha_1$ were equal to $\alpha_3$, then the result would be same as in FIG. 1. Using a different path and a different value for $\alpha_3$ (i.e., =1) provides more reliable triggering of the EoBD logic.

Figure 8:
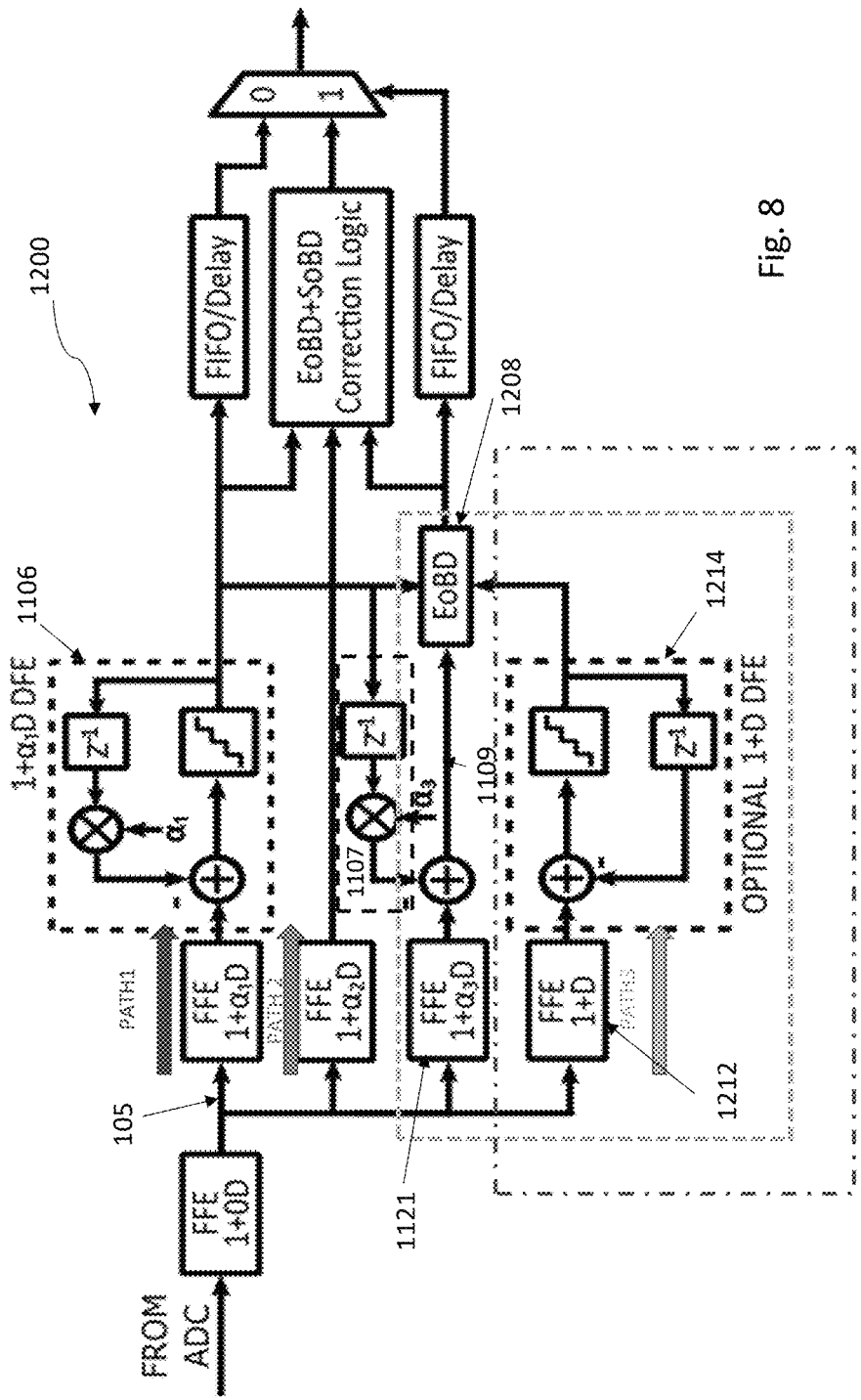
FIG. 8 depicts yet another error detection and correction system, according to embodiments of the disclosure.

FIG. 8 depicts another error detection and correction system according to embodiments of the disclosure. According to embodiments of the disclosure, a receiver 1200 includes the receiver 1100, except for differently operating EoBD logic and some additional components.

For example, receiver 1200 includes a fourth FFE 1212 for providing a plurality of fourth FFE output symbols based at least in part upon the input symbol sequence 105, and a second DFE 1214 for providing a plurality of second DFE output symbols based at least in part upon the input symbol sequence 105. The second DFE 1214 includes a feedback loop with a second weighting ($\alpha_4$, e.g., $\alpha_4=1$) that may be different from the first weighting ($\alpha_1$, e.g., $\alpha_1=0.6$).

According to embodiments of the disclosure, EOB detection logic 1208 determines the EoB position based upon determining a symbol position that is one position (k−1) before: (a) a symbol position k at which there is a first, non-zero difference at time k between an output symbol, of the plurality of output symbols, of the DFE 1106 (path 1) and a second DFE output symbol, of the plurality of second DFE output symbols, of the second DFE 1214, or (b) if there is no such first difference, a symbol position k at which a difference 1109 at time k between the third FFE 1121 output symbol and the filtered DFE 1106 output symbol is out of range of a range of values of the quantizer of the DFE 1206.

Alternatively, the EOB detection logic 1208, or the EoB detection logic in the other embodiments herein, determines the EoB position based upon comparison (e.g., with a comparator inside the EOB detection logic) of difference 1109 or a similar difference with values representing the quantizer range.

Note that if $\alpha_1$ is large enough, the DFE 1106 burst error will eventually reach an extremum and the burst will disappear. If, however, $\alpha_1 \ll 1$, the DFE feedback will be small, so noise could cancel error in the burst before reaching an extremum. If noise cancels the error from DFE feedback, then the consequent DFE decision outputs are going to be correct. In this case, EoBD detection logic in 1108 (FIG. 7) is not triggered and there will be a long burst appearing at the output of mux 1128 without correction. By adding a second DFE 1214, using $\alpha_4=1$, for example, noise will not cancel the DFE feedback and the error will continue to propagate until it hits an extremum.

If there is a difference in the outputs of the two DFEs, the EoB location is defined as a symbol position that is one position (k−1) before a symbol position k at which there is a first, non-zero difference at time k between an output symbol, of the plurality of output symbols, of the DFE 1106 and a second DFE output symbol, of the plurality of second DFE output symbols, of the second DFE 1214.

Figure 9B:
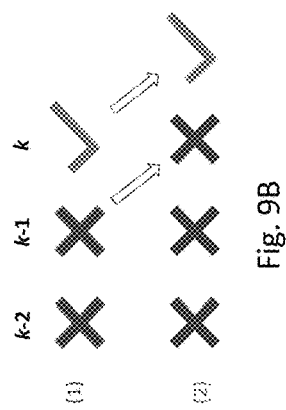
FIG. 9B depicts DFE and quantizer decisions in connection with FIG. 9A.
Figure 9A:
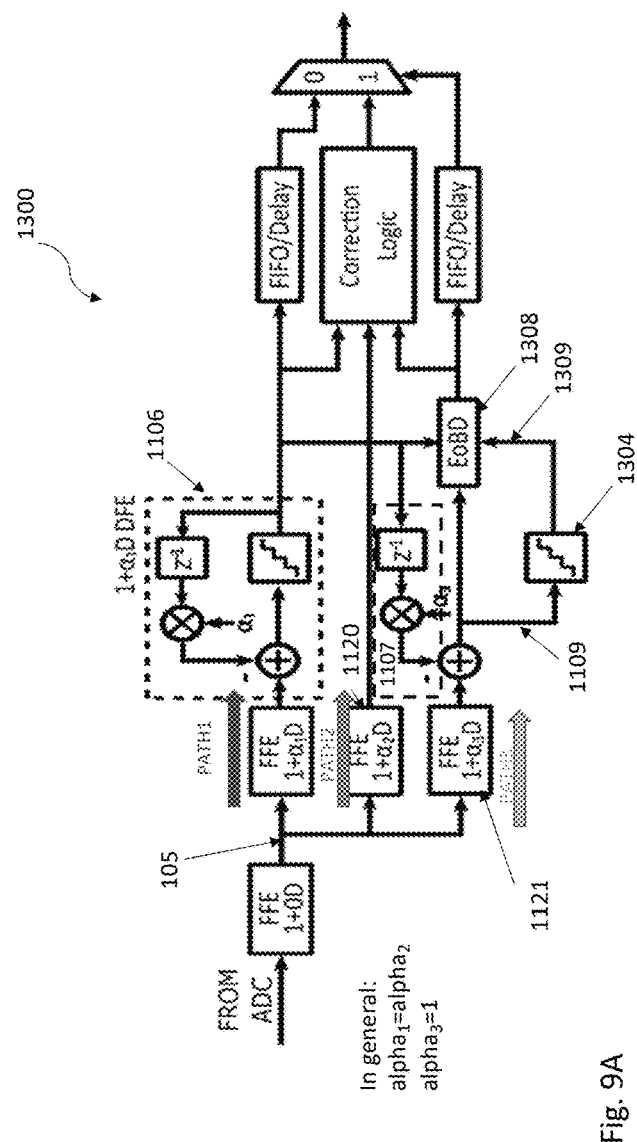
FIG. 9A depicts still another error detection and correction system, according to embodiments of the disclosure.

FIG. 9A depicts another error detection and correction system according to embodiments of the disclosure. According to embodiments of the disclosure, a receiver 1300 includes the receiver 1100, except for differently operating EoBD logic 1308 and some additional components.

For example, instead of employing another DFE (such as DFE 1214) to provide a hard decision, receiver 1300 includes a quantizer 1304 that quantizes the difference 1109 between the third FFE output symbols of FFE 1121 and the filtered DFE 1106 output symbols to provide a quantized decision output 1309.

According to embodiments of the disclosure, the EOB detection logic 1308 determines the EoB position based upon determining a symbol position that is one position (k−1) before: (a) a symbol position k at which there is a first, non-zero difference at time k between an output symbol, of the plurality of output symbols, of the DFE 1106 and a quantizer 1304 output symbol 1309, of the plurality of quantizer output symbols, or (b) if there is no such first difference, a symbol position k at which a difference 1109 at time k between the third FFE 1121 output symbol and the filtered DFE output symbol is out of range of the range of values of the quantizer 1304.

Alternatively, the EOB detection logic 1308, or the EoB detection logic in the other embodiments herein, determines the EoB position based upon comparison (e.g., with a comparator inside the EOB detection logic) of difference 1109 or a similar difference with values representing the quantizer range. If the EoB detection logic uses difference 1109, then a line would communicate the difference 1109 to the EoB detection logic, as shown in FIG. 9A.

Referring to FIG. 9B, line 1 represents the decisions of first DFE 1106 in Path 1 and line 2 represents the decisions of quantizer 1304 in Path 3. Assume, for example, $\alpha_1=\alpha_2=0.6$, and $\alpha_3=1$, If random noise cancels a feedback error in the $\alpha_1$-weighted feedback loop of DFE 1106 at time k, this would result in a correct DFE decision at time k (so EoB would be at k−1). The receiver 1300 replicates the error at time k−1 in Path 1 through the delay in FIR filter 1107. The filter 1107 multiplies the error symbol at k−1 by $\alpha_3$. This, in turn, results in the quantizer 1304 making an incorrect decision, which results in a difference between the quantizer 1304 output and the DFE 1106 output. This difference indicates that the EoB would be at k−1.

Figure 6:
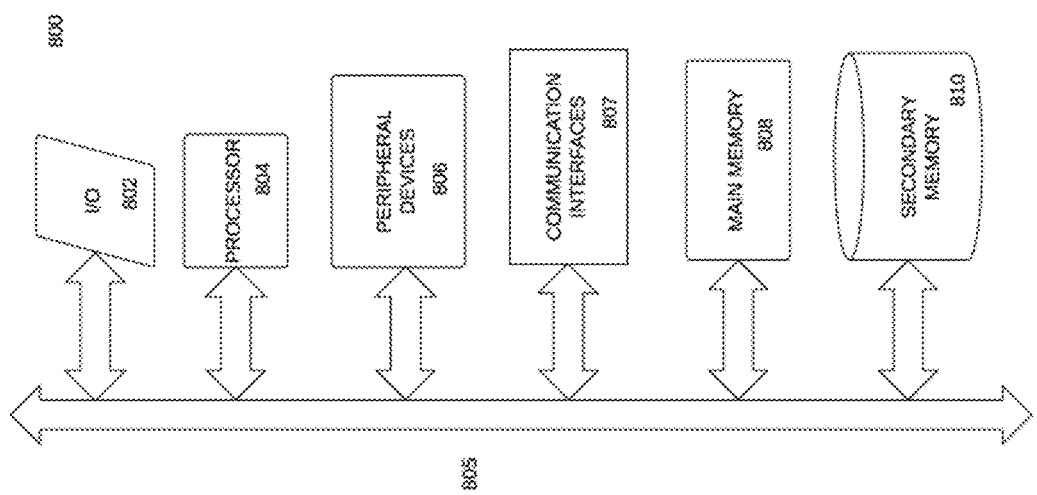
FIG. 6 depicts a computer system that may be used in implementing embodiments of the disclosure.

FIG. 6 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as the engine, may be implemented with a computer system like that of computer system 800.

Program code may be stored in non-transitory media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or." Unless otherwise indicated herein, the phrase "based upon" or the like means "based at least in part upon" or the like, and shall not be limited to mean "based solely on" or the like. Unless otherwise indicated herein, the term "coupled" means directly or indirectly coupled.

All references cited herein, including, without limitation, articles, publications, patents, patent publications, and patent applications, are incorporated by reference in their entireties for all purposes, except that any portion of any such reference is not incorporated by reference herein to the extent it: (1) is inconsistent with embodiments of the disclosure expressly described herein; (2) limits the scope of any embodiments described herein; or (3) limits the scope of any terms of any claims recited herein. Mention of any reference, article, publication, patent, patent publication, or patent application cited herein is not, and should not be taken as an acknowledgment or any form of suggestion that it constitutes valid prior art or forms part of the common general knowledge in any country in the world, or that it discloses essential matter.

In the claims below, a claim n reciting "any one of the preceding claims starting with claim x," shall refer to any one of the claims starting with claim x and ending with the immediately preceding claim (claim n-1). For example, if claim 35 were to recite "The system of any one of the preceding claims starting with claim 28," it would be referring to the system of any one of claims 28-34.

EMBODIMENTS OF THE DISCLOSURE

In the dependent embodiments below, references to base embodiments refer to embodiments within the same embodiments set, unless otherwise indicated.

The embodiments below include reference numbers merely to refer to example embodiments as a matter of convenience. They are not intended to limit the embodiments in any manner whatsoever.

System Embodiment Set

1. A receiver for providing a corrected output symbol sequence, the receiver comprising:
   a. a decision feedback equalizer (DFE) 106, 1106 for generating an output sequence of DFE decision symbols based at least in part upon an input symbol sequence 105;
   b. a second feed forward equalizer (FFE) 120 for generating a second equalized output symbol sequence based at least in part upon the input symbol sequence 105; and
   c. correction logic 122, responsive to determination of an end of burst error (EoB) position of a burst error sequence in the DFE output sequence, that is operable to:
      i. determine a candidate earliest start of burst (SoB) position; and
      ii. determine the corrected output symbol sequence based at least in part upon a sequence comparison of the second equalized output symbol sequence with candidate symbol sequences that correspond to corrections of DFE decision output symbols in the burst error sequence,
      iii. wherein the sequence comparison includes a comparison of symbols residing between the candidate earliest SoB position and one position after the EoB position (inclusive).

2. The receiver of any one of the preceding embodiments, further comprising a first FFE 104 that is operable to generate a first equalized output symbol sequence, coupled to an input of the DFE, based at least in part upon the input symbol sequence, wherein the first equalized output symbol sequence is different from the second equalized output symbol sequence.

3. The receiver of any one of the preceding embodiments, wherein each symbol of the second equalized output symbol sequence includes intersymbol interference (ISI) from at least one postcursor or at least one precursor.

4. The receiver of any one of the preceding embodiments, wherein the comparison is performed on candidate symbols residing between M symbol positions before the candidate earliest SoB position and N positions after the EoB position (inclusive), wherein each symbol of the second equalized output symbol sequence includes ISI from M precursors and N postcursors.

5. The receiver of any one of the preceding embodiments, wherein the comparison is not performed on candidate symbols more than M symbol positions before the candidate earliest SoB position or more than N positions after the EoB position, wherein the second equalized output symbol sequence includes M precursors and N postcursors.

6. The receiver of any one of the preceding embodiments, wherein the correction logic is operable to determine the corrected output symbol sequence based upon determination of an actual SoB position.

7. The receiver of any one of the preceding embodiments, further comprising EoB detection logic 108, wherein the DFE includes a quantizer, and the EoB detection logic is operable to determine the EoB position based upon determining a symbol position that is one position before a symbol position in which a quantizer input symbol is out of range of a range of values of the quantizer.

8. The receiver of any one of embodiments 1-6, further comprising:
  EOB detection logic 1108;
  a third FFE 1121 for providing a plurality of third equalized output symbols based at least in part upon the input symbol sequence; and
  an FIR filter 1107 for providing a plurality of filtered DFE output symbols comprising weighted delayed versions of the DFE decision output symbols,
  wherein the DFE includes a quantizer, and
  the EOB detection logic is operable to determine the EoB position based upon determining a symbol position that is one position before a symbol position in which a difference 1109 between a third FFE 1121 equalized output symbol, of the plurality of third equalized output symbols, and a filtered DFE output symbol, of the plurality of filtered DFE output symbols, is out of range of a range of values of the quantizer, wherein a weighting $\alpha_3$ of the filtered DFE output symbols is different from a first weighting $\alpha_1$ of the DFE output symbols in a feedback loop within the DFE 1106.

9. The receiver of embodiment 8, wherein the weighting ($\alpha_3$) of the filtered DFE output symbols equals 1.

10. The receiver of embodiment 8, further comprising:
  a. a fourth FFE 1212 for providing a plurality of fourth equalized output symbols based at least in part upon the input symbol sequence 105; and
  b. a second DFE 1214 for providing a plurality of second DFE output symbols based at least in part upon the plurality of fourth equalized output symbols, and having a feedback loop including a second weighting ($\alpha_4$ assumed=1 in examples; not shown in FIG. 8) different from the first weighting $\alpha_1$,
  wherein the EOB detection logic is operable to determine the EoB position based upon determining a symbol position that is one position (k−1) before:
    i. a symbol position k at which there is a first, non-zero difference at time k between an output symbol, of the plurality of output symbols, of the DFE 1106 and a second DFE output symbol, of the plurality of second DFE output symbols, of the second DFE 1214, or
    ii. if there is no such first difference, a symbol position k at which a difference 1109 at time k between the third FFE 1121 output symbol and the filtered DFE 1106 output symbol is out of range of a range of values of the quantizer.

11. The receiver of embodiment 10, wherein the first weighting $\alpha_1$ is less than or equal to the second weighting $\alpha_4$, which is less than or equal to 1.

12. The receiver of any one of embodiments 1-6, further comprising:
  a. EOB detection logic 1308;
  b. a third FFE 1121 for providing a plurality of third equalized output symbols based at least in part upon the input symbol sequence; and
  c. an FIR filter 1107 for providing a plurality of filtered DFE output symbols comprising weighted ($\alpha_3$) delayed versions of the DFE decision output symbols,
  d. a quantizer 1304 for providing a plurality of quantizer output symbols based at least in part upon the plurality of third FFE 1121 output symbols and the plurality of filtered DFE output symbols,
  wherein the EOB detection logic 1308 is operable to determine the EoB position based upon determining a symbol position that is one position (k−1) before:
    i. a symbol position k at which there is a first, non-zero difference at time k between an output symbol, of the plurality of output symbols, of the DFE 1106 and a quantizer 1304 output symbol 1309, of the plurality of quantizer output symbols, or
    ii. if there is no such first difference, a symbol position k at which a difference at time k between the third FFE 1121 output symbol and the filtered DFE output symbol is out of range of a range of values of the quantizer 1304.

13. The receiver of embodiment 12, wherein a first weighting $\alpha_1$ of the DFE 106 is less than or equal to a second weighting $\alpha_3$ of the FIR filter 1107, which may be less than or equal to 1.

14. The receiver of any one of the preceding embodiments, wherein the correction logic is operable to determine the candidate earliest SoB position based upon determining a symbol position that is one position after a symbol position in which a corrected DFE output symbol would be out of range for the modulation scheme of the symbols.

15. The receiver of any one of the preceding embodiments, wherein
  a. a first of the candidate symbol sequences corresponds to a corrective application to the DFE output symbol sequence of a first candidate error sequence having error values occupying all positions between the candidate earliest SoB position and the EoB position (inclusive), and
  b. subsequent candidate symbol sequences each correspond to a corrective application to the DFE output symbol sequence of a candidate error sequence having error values occupying all positions starting with a successively incremented position after the candidate earliest SoB position and ending with the EoB position.

16. The receiver of embodiment 15, wherein the candidate symbol sequences include the DFE output symbol sequence without corrective application of any error values.

17. The receiver of embodiment 15, wherein the candidate error sequences comprise error values having sequentially alternating signs.

18. The receiver of embodiment 15, wherein the candidate error sequences comprise alternating error values.

19. The receiver of any one of the preceding embodiments, wherein the sequence comparison comprises computing distances between the second equalized output symbol sequence and the candidate symbol sequences.

20. The receiver of embodiment 19, wherein the corrected output symbol sequence corresponds to a candidate symbol sequence corresponding to a minimum of the distances.

21. The receiver of any one of the preceding embodiments starting with embodiment 2, further comprising a shared FFE that is operable to perform preliminary equalization on a preliminary input symbol sequence to produce the input symbol sequence 105, wherein:
  a. the first FFE is operable to perform first partial response equalization of the input symbol sequence 105 to generate the first equalized output sequence that is input to the DFE; and b. the second FFE is operable to perform second partial response equalization of the input symbol sequence 105 to generate the second equalized output symbol sequence.
22. The receiver of embodiment 21, wherein the first partial response equalization comprises $1+\alpha_1 D$ feed forward equalization, and the second partial response equalization comprises feed forward equalization having one or more weighted delays.
23. The receiver of embodiment 22, wherein $\alpha_1=1$, and at least one of the weighted delays is not equal to 1.
24. The receiver of any one of the preceding embodiments, wherein the candidate symbol sequences correspond to FIR-filtered corrections of DFE decision output symbols in the burst error sequence.

Method Embodiment Set

1. A method for providing a corrected output symbol sequence, the method comprising:
   a. based determining an end of burst error (EoB) position of a burst error sequence in a decision feedback equalizer (DFE) output sequence of symbols from a DFE (106, 1106):
      i. determining a candidate earliest start of burst (SoB) position; and
      ii. determining the corrected output symbol sequence based at least in part upon a sequence comparison of a second equalized output symbol sequence with candidate symbol sequences that correspond to corrections of DFE decision output symbols in the burst error sequence,
      iii. wherein the output sequence of DFE decision symbols and the second equalized output symbol sequence are based at least in part upon an input symbol sequence 105, and
      iv. the sequence comparison includes a comparison of symbols residing between the candidate earliest SoB position and one position after the EoB position (inclusive).
2. The method of any one of the preceding embodiments, wherein the second equalized output symbol sequence is different from a first equalized output symbol sequence input to the DFE.
3. The method of any one of the preceding embodiments, wherein each symbol of the second equalized output symbol sequence includes intersymbol interference (ISI) from at least one postcursor or at least one precursor.
4. The method of any one of the preceding embodiments, wherein the comparison is performed on candidate symbols residing between M symbol positions before the candidate earliest SoB position and N positions after the EoB position (inclusive), wherein each symbol of the second equalized output symbol sequence includes ISI from M precursors and N postcursors.
5. The method of any one of the preceding embodiments, wherein the comparison is not performed on candidate symbols more than M symbol positions before the candidate earliest SoB position or more than N positions after the EoB position, wherein the second equalized output symbol sequence includes M precursors and N postcursors.
6. The method of any one of the preceding embodiments, wherein determining the corrected output symbol sequence comprises determining an actual SoB position.
7. The method of any one of the preceding embodiments, wherein determining the EoB position comprises determining a symbol position that is one position before a symbol position in which a DFE quantizer input symbol is out of range of a range of values of a quantizer of the DFE.
8. The method of any one of embodiments 1-6, further comprising:
   providing a plurality of third equalized output symbols based at least in part upon the input symbol sequence; and
   providing a plurality of filtered DFE output symbols comprising weighted delayed versions of the DFE decision output symbols,
   determining the EoB position based upon determining a symbol position that is one position before a symbol position in which a difference 1109 between a third equalized output symbol, of the plurality of third equalized output symbols, and a filtered DFE output symbol, of the plurality of filtered DFE output symbols, is out of range of a range of values of a quantizer of the DFE, wherein a weighting $\alpha_3$ of the filtered DFE output symbols is different from a first weighting $\alpha_1$ of the DFE output symbols in a feedback loop within the DFE.
9. The method of embodiment 8, wherein the weighting ($\alpha_3$) of the filtered DFE output symbols equals 1.
10. The method of embodiment 8, further comprising:
    a. providing a plurality of fourth equalized output symbols based at least in part upon the input symbol sequence 105; and
    b. a second DFE 1214 providing a plurality of second DFE output symbols based at least in part upon the plurality of fourth equalized output symbols, the second DFE having a feedback loop including a second weighting different from the first weighting $\alpha_1$,
    wherein the the EoB position is based upon determining a symbol position that is one position (k−1) before:
       i. a symbol position k at which there is a first, non-zero difference at time k between an output symbol, of the plurality of output symbols, of the DFE 1106 and a second DFE output symbol, of the plurality of second DFE output symbols, of the second DFE 1214, or
       ii. if there is no such first difference, a symbol position k at which a difference 1109 at time k between the third equalized output symbol and the filtered DFE output symbol is out of range of a range of values of the quantizer.
11. The method of embodiment 10, wherein the first weighting $\alpha_1$ is less than or equal to the second weighting $\alpha_4$, which is less than or equal to 1.
12. The method of any one of embodiments 1-6, further comprising:
    a. providing a plurality of third equalized output symbols based at least in part upon the input symbol sequence; and
    b. providing a plurality of filtered DFE output symbols comprising weighted ($\alpha_3$) delayed versions of the DFE decision output symbols,
    c. providing a plurality of quantizer output symbols based at least in part upon the plurality of third equalized output symbols and the plurality of filtered DFE output symbols,
    d. determining the EoB position based upon determining a symbol position that is one position (k−1) before:

i. a symbol position k at which there is a first, non-zero difference at time k between an output symbol, of the plurality of output symbols, of the DFE 1106 and a quantizer output symbol 1309, of the plurality of quantizer output symbols, or ii. if there is no such first difference, a symbol position k at which a difference at time k between the third equalized output symbol and the filtered DFE output symbol is out of range of a range of values of the quantizer 1304.

13. The method of embodiment 12, wherein a first weighting $\alpha_1$ of the DFE 106 is less than or equal to a second weighting $\alpha_3$ of the FIR filter 1107, which may be less than or equal to 1.

14. The method of any one of the preceding embodiments, wherein determining the candidate earliest SoB position is based upon determining a symbol position that is one position after a symbol position in which a corrected DFE output symbol would be out of range for the modulation scheme of the symbols.

15. The method of any one of the preceding embodiments, wherein
    a. a first of the candidate symbol sequences corresponds to a corrective application to the DFE output symbol sequence of a first candidate error sequence having error values occupying all positions between the candidate earliest SoB position and the EoB position (inclusive), and
    b. subsequent candidate symbol sequences each correspond to a corrective application to the DFE output symbol sequence of a candidate error sequence having error values occupying all positions starting with a successively incremented position after the candidate earliest SoB position and ending with the EoB position.

16. The method of embodiment 15, wherein the candidate symbol sequences include the DFE output symbol sequence without corrective application of any error values.

17. The method of embodiment 15, wherein the candidate error sequences comprise error values having sequentially alternating signs.

18. The method of embodiment 15, wherein the candidate error sequences comprise alternating error values.

19. The method of any one of the preceding embodiments, wherein the sequence comparison comprises computing distances between the second equalized output symbol sequence and the candidate symbol sequences.

20. The method of embodiment 19, wherein the corrected output symbol sequence corresponds to a candidate symbol sequence corresponding to a minimum of the distances.

21. The method of any one of the preceding embodiments starting with embodiment 2, further comprising:
    a. performing preliminary equalization on a preliminary input symbol sequence to produce the input symbol sequence 105;
    b. performing first partial response equalization of the input symbol sequence 105 to generate the first equalized output sequence that is input to the DFE; and
    c. performing second partial response equalization of the input symbol sequence 105 to generate the second equalized output symbol sequence.

22. The method of embodiment 21, wherein the first partial response equalization comprises $1+\alpha_1 D$ feed forward equalization, and the second partial response equalization comprises feed forward equalization having one or more weighted delays.

23. The method of embodiment 22, wherein $\alpha_1=1$, and at least one of the weighted delays is not equal to 1.

24. The method of any one of the preceding embodiments, wherein the candidate symbol sequences correspond to FIR-filtered corrections of DFE decision output symbols in the burst error sequence.

Computer-Readable Media Embodiment Set

1. One or more non-transitory computer readable media storing instructions that, when executed, cause one or more computing devices to perform the method of any one of method embodiments 1-24.

What is claimed is:

1. A receiver for providing a corrected output symbol sequence, the receiver comprising:
   a. a decision feedback equalizer (DFE) for generating an output sequence of DFE decision symbols based at least in part upon an input symbol sequence;
   b. a second feed forward equalizer (FFE) for generating a second equalized output symbol sequence based at least in part upon the input symbol sequence; and
   c. correction logic, responsive to determination of an end of burst error (EoB) position of a burst error sequence in the DFE output sequence, that is operable to:
      i. determine a candidate earliest start of burst (SoB) position; and
      ii. determine the corrected output symbol sequence based at least in part upon a sequence comparison of the second equalized output symbol sequence with candidate symbol sequences that correspond to corrections of DFE decision output symbols in the burst error sequence,
      iii. wherein the sequence comparison includes a comparison of symbols residing between the candidate earliest SoB position and one position after the EoB position (inclusive).

2. The receiver of claim 1, further comprising a first FFE that is operable to generate a first equalized output symbol sequence, coupled to an input of the DFE, based at least in part upon the input symbol sequence, wherein the first equalized output symbol sequence is different from the second equalized output symbol sequence.

3. The receiver of claim 2, further comprising a shared FFE that is operable to perform preliminary equalization on a preliminary input symbol sequence to produce the input symbol sequence, wherein:
   a. the first FFE is operable to perform first partial response equalization of the input symbol sequence to generate the first equalized output sequence that is input to the DFE; and
   b. the second FFE is operable to perform second partial response equalization of the input symbol sequence to generate the second equalized output symbol sequence.

4. The receiver of claim 3, wherein the first partial response equalization comprises $1+\alpha_1 D$ feed forward equalization, and the second partial response equalization comprises feed forward equalization having one or more weighted delays.

5. The receiver of claim 4, wherein $\alpha_1=1$, and at least one of the weighted delays is not equal to 1.

6. The receiver of claim 1, wherein each symbol of the second equalized output symbol sequence includes intersymbol interference (ISI) from at least one postcursor or at least one precursor.

7. The receiver of claim 1, wherein the comparison is performed on candidate symbols residing between M symbol positions before the candidate earliest SoB position and N positions after the EoB position (inclusive), wherein each symbol of the second equalized output symbol sequence includes ISI from M precursors and N postcursors.

8. The receiver of claim 1, wherein the comparison is not performed on candidate symbols more than M symbol positions before the candidate earliest SoB position or more than N positions after the EoB position, wherein the second equalized output symbol sequence includes M precursors and N postcursors.

9. The receiver of claim 1, wherein the correction logic is operable to determine the corrected output symbol sequence based upon determination of an actual SoB position.

10. The receiver of claim 1, further comprising EoB detection logic 108, wherein the DFE includes a quantizer, and the EoB detection logic is operable to determine the EoB position based upon determining a symbol position that is one position before a symbol position in which a quantizer input symbol is out of range of a range of values of the quantizer.

11. The receiver of claim 1, further comprising:
EOB detection logic;
a third FFE for providing a plurality of third equalized output symbols based at least in part upon the input symbol sequence; and
an FIR filter for providing a plurality of filtered DFE output symbols comprising weighted delayed versions of the DFE decision output symbols,
wherein the DFE includes a quantizer, and
the EOB detection logic is operable to determine the EoB position based upon determining a symbol position that is one position before a symbol position in which a difference between a third FFE equalized output symbol, of the plurality of third equalized output symbols, and a filtered DFE output symbol, of the plurality of filtered DFE output symbols, is out of range of a range of values of the quantizer, wherein a weighting $\alpha_3$ of the filtered DFE output symbols is different from a first weighting $\alpha_1$ of the DFE output symbols in a feedback loop within the DFE.

12. The receiver of claim 11, wherein the weighting ($\alpha_3$) of the filtered DFE output symbols equals 1.

13. The receiver of claim 11, further comprising:
a. a fourth FFE for providing a plurality of fourth equalized output symbols based at least in part upon the input symbol sequence 105; and
b. a second DFE for providing a plurality of second DFE output symbols based at least in part upon the plurality of fourth equalized output symbols, and having a feedback loop including a second weighting different from the first weighting $\alpha_1$,
wherein the EOB detection logic is operable to determine the EoB position based upon determining a symbol position that is one position (k−1) before:
i. a symbol position k at which there is a first, non-zero difference at time k between an output symbol, of the plurality of output symbols, of the DFE and a second DFE output symbol, of the plurality of second DFE output symbols, of the second DFE, or
ii. if there is no such first difference, a symbol position k at which a difference at time k between the third FFE output symbol and the filtered DFE output symbol is out of range of a range of values of the quantizer.

14. The receiver of claim 13, wherein the first weighting $\alpha_1$ is less than or equal to the second weighting $\alpha_4$, which is less than or equal to 1.

15. The receiver of claim 1, further comprising:
a. EOB detection logic;
b. a third FFE for providing a plurality of third equalized output symbols based at least in part upon the input symbol sequence; and
c. an FIR filter for providing a plurality of filtered DFE output symbols comprising weighted ($\alpha_3$) delayed versions of the DFE decision output symbols,
d. a quantizer for providing a plurality of quantizer output symbols based at least in part upon the plurality of third FFE output symbols and the plurality of filtered DFE output symbols,
wherein the EOB detection logic is operable to determine the EoB position based upon determining a symbol position that is one position (k−1) before:
i. a symbol position k at which there is a first, non-zero difference at time k between an output symbol, of the plurality of output symbols, of the DFE and a quantizer output symbol, of the plurality of quantizer output symbols, or
ii. if there is no such first difference, a symbol position k at which a difference at time k between the third FFE output symbol and the filtered DFE output symbol is out of range of a range of values of the quantizer.

16. The receiver of claim 15, wherein a first weighting $\alpha_1$ of the DFE is less than or equal to a second weighting $\alpha_3$ of the FIR filter, which may be less than or equal to 1.

17. The receiver of claim 1, wherein the correction logic is operable to determine the candidate earliest SoB position based upon determining a symbol position that is one position after a symbol position in which a corrected DFE output symbol would be out of range for the modulation scheme of the symbols.

18. The receiver of claim 1, wherein
a. a first of the candidate symbol sequences corresponds to a corrective application to the DFE output symbol sequence of a first candidate error sequence having error values occupying all positions between the candidate earliest SoB position and the EoB position (inclusive), and
b. subsequent candidate symbol sequences each correspond to a corrective application to the DFE output symbol sequence of a candidate error sequence having error values occupying all positions starting with a successively incremented position after the candidate earliest SoB position and ending with the EoB position.

19. The receiver of claim 18, wherein the candidate symbol sequences include the DFE output symbol sequence without corrective application of any error values.

20. The receiver of claim 18, wherein the candidate error sequences comprise error values having sequentially alternating signs.

21. The receiver of claim 18, wherein the candidate error sequences comprise alternating error values.

22. The receiver of claim 1, wherein the sequence comparison comprises computing distances between the second equalized output symbol sequence and the candidate symbol sequences.

23. The receiver of claim 22, wherein the corrected output symbol sequence corresponds to a candidate symbol sequence corresponding to a minimum of the distances.

24. The receiver of claim 1, wherein the candidate symbol sequences correspond to FIR-filtered corrections of DFE decision output symbols in the burst error sequence.

25. A method for providing a corrected output symbol sequence, the method comprising:

a. based on determining an end of burst error (EoB) position of a burst error sequence in a decision feedback equalizer (DFE) output sequence of symbols from a DFE:
  i. determining a candidate earliest start of burst (SoB) position; and
  ii. determining the corrected output symbol sequence based at least in part upon a sequence comparison of a second equalized output symbol sequence with candidate symbol sequences that correspond to corrections of DFE decision output symbols in the burst error sequence,
  iii. wherein the output sequence of DFE decision symbols and the second equalized output symbol sequence are based at least in part upon an input symbol sequence, and
  iv. the sequence comparison includes a comparison of symbols residing between the candidate earliest SoB position and one position after the EoB position (inclusive).

26. One or more non-transitory computer readable media storing instructions that, when executed, cause one or more computing devices to perform:

a. based on determining an end of burst error (EoB) position of a burst error sequence in a decision feedback equalizer (DFE) output sequence of symbols from a DFE:
  i. determining a candidate earliest start of burst (SoB) position; and
  ii. determining the corrected output symbol sequence based at least in part upon a sequence comparison of a second equalized output symbol sequence with candidate symbol sequences that correspond to corrections of DFE decision output symbols in the burst error sequence,
  iii. wherein the output sequence of DFE decision symbols and the second equalized output symbol sequence are based at least in part upon an input symbol sequence, and
  iv. the sequence comparison includes a comparison of symbols residing between the candidate earliest SoB position and one position after the EoB position (inclusive).

* * * * *